Aug. 25, 1964   J. BORRINO   3,145,558
LUBRICANT TEST APPARATUS
Filed June 24, 1960
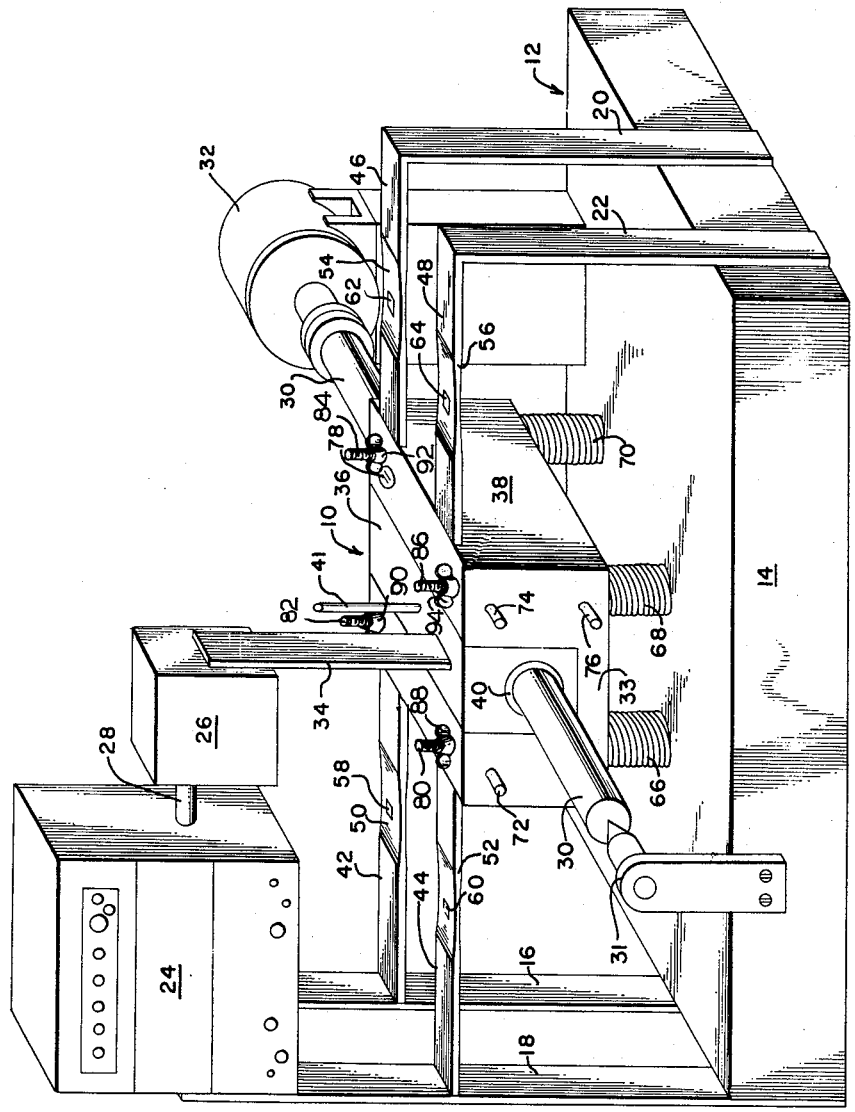
INVENTOR
JOSEPH BORRINO
BY Adams, Forward & McFee
ATTORNEY 3,145,558
LUBRICANT TEST APPARATUS
Joseph Borrino, Park Forest, Ill., assignor, by mesne assignments, to Sinclair Research, Inc., New York, N.Y., a corporation of Delaware
Filed June 24, 1960, Ser. No. 38,520
11 Claims. (Cl. 73—10)

This invention relates to an apparatus for determining and measuring the characteristics of a lubricant and more particularly to an apparatus for determining lubricant film thickness at various operation conditions.

One who uses oil, greases, and other lubricants in substantial volume is vitally interested in the lubricating value of these products and in the changes in lubricating properties which take place when these materials are used under different operating conditions. The ability to reduce friction between surfaces under heavy loads involves the film strength of the lubricant, that is, the property which enables a lubricant to separate one surface from another so that the surfaces move over each other easily and with a minimum expenditure of work and wear. Film strength of a lubricant is generally tested by its ability to maintain two frictional surfaces separated from each other under varying load and other operating conditions. While very helpful to the user of lubricants, this information is normally difficult and expensive to obtain. Since various lubricating compositions are to be subjected to varying conditions of loading, temperature, etc., in actual use, each lubricant needs to be tested under conditions simulating those which will actually prevail in use.

The present invention provides a means for testing a given lubricating oil or grease under simulated loading, rotating speed and temperature conditions to determine whether or not the lubricant is adequate for the purposes required. The apparatus of this invention demonstrates the ability or lack of ability of a lubricating oil or grease to provide the necessary lubrication under various temperatures, loads, and dynamic overloads using either gravity or forced feed lubricant systems. Thus, the importance of this invention becomes readily apparent to one skilled in the art, since the desired information can be accurately and inexpensively gathered under test conditions.

This invention provides a relatively compact and inexpensive, yet effective, lubricant testing device which comprises a stationary support and a vertically moveable body. The body includes a block having a bearing mounted therein. A rotatable shaft is mounted in the bearing and held to prevent horizontal or vertical displacement. The shaft may be fixed between two rotatable lathe centers and the shaft is normally driven by a variable speed motor. The block has heating, cooling and loading means which may be loading springs or the like but in any event will allow essentially only vertical movement of the block. There is a means of measuring the displacement of the bearing away from the shaft due to the presence of an effective lubricating oil or grease. Generally, the bottom of the shaft will be in contact with the bearing when there is no lubricant present but when an effective lubricant is charged to the block, this lubricant passes between the shaft and the bearing so that there is a vertical displacement of the bearing block when lubricant is distributed around the shaft.

Horizontal movement of the body is prevented and vertical movement permitted through the use of flex bars which are attached to the block and to the stationary support. The flex bars may be attached to the block in any convenient manner so long as they allow the block to move in the vertical direction; they may be mounted at the top, bottom or elsewhere on the body. The block is associated with measurement means for determining the displacement of the bearing away from the shaft. This vertical movement, and therefore the thickness of the bearing lubricant film, may be measured by the use of an optical system.

The loading means comprise resilient mounting means preferably arranged around the periphery of the bottom of the body. These means exert a pressure on the body which tends to move the body upwards and therefore tends to push the bottom inner surface of the bearing against the bottom of the shaft. The lubricant must work against this upward force to lubricate the entire surface of the shaft. If it is a successful lubricant it forces the bottom surface of the bearing away from the bottom of the shaft and thereby causes a slight descent of the body.

The extent of loading may be changed by changing the compression on spring loading means or the force applied to another resilient mounting means, e.g. hydraulic pistons with compressible fluids. In any case, the springs or the hydraulic fluid still retain an amount of resiliency sufficient to allow the lubricant film to cause downward movement of the body. The loading force applied to the body is preferably uniform around the periphery. Such uniform loading causes uniform flexing of the flex bars. The uniformity of loading and the amount of loading may be determined through the use of strain gauges affixed to the horizontal flex bars. Also, the provision of a plurality of loading means allows non-uniform loading where such is desired and the strain gauges may tell when the desired degree of non-uniformity is reached.

The invention will be better understood by reference to the accompanying drawing which shows a perspective view of the film strength and thickness tester.

The device includes the moveable body indicated generally as 10 and the stationary support indicated generally as 12. The support, in the embodiment illustrated, comprises base 14 and standards 16, 18, 20 and 22. As shown, standards 16 and 18 support the recording means for example a camera 24, to which the sensing means, for example a lens assembly 26, is fixedly attached by means of the holder 28. Also fixedly positioned is the shaft 30 which may be suspended by any rotatable means, such as lathe centers 31, which can transmit rotary motion from any suitable source such as a variable speed motor 32.

The body 10 includes the bearing support 33 to which the stick 34 is rigidly attached. In the preferred embodiment the bearing support comprises the block 36 and the cradle 38 which are rigidly fastened together by means not shown, to simplify replacement of the bearing. As shown, the block 36 is provided with a bearing 40 and a lubricant duct 41 which penetrates the block 36 and the bearing 40, giving the lubricant access to the space between the shaft 30 and the bearing 40. The body 10 is resiliently mounted on the stationary member 14 by means of the flexible bars 42, 44, 46 and 48. As shown, these flex bars are attached at one end to the standards 16, 18, 20 and 22 respectively. Also as shown, the bars derive their flexibility from having a reduced portion 50, 52, 54, 56 at their approximate midsection. It will be noted that the flex bars 42, 44, 46 and 48 prevent any horizontal movement of the body, while allowing vertical movement, and also that the provision of the reduced portions confine the major vertical movements to these sections. It is therefore possible and desirable to provide each reduced portion 50, 52, 54, 56 with the strain gauges 58, 60, 62 and 64 respectively. These gauges are conventional and may be connected by a conventional wiring scheme to indicators which show the amount of vertical flexure of each bar. It will be noted that without the provision of further supporting means for the body 10, the weight of the body would pull the bearing 40 down into contact with the stationarily-mounted shaft 30.

The effect of the weight of the body is overcome by the use of resilient loading means which exert an upward vertical force on the body. The means illustrated comprise the springs 66, 68, 70 and a fourth spring not shown, supporting the remote corner of the cradle 38. Alternatively the loading means may be hydraulically actuated pistons or other means which will be apparent to one skilled in the art. Where springs are used for loading, the degree of loading, which, of course, varies with the amount of compression of the springs, may be adjusted by employing the bolts 80, 82, 84 and 86 which are fixedly attached to the base 14 and which pass freely through the center of the springs and into holes in the bearing support 33. Threaded fastening means, such as the wing nuts 88, 90, 92 and 94 may be applied to these bolts. When the wing nuts are tightened, the springs 66, 68, 70, etc., are compressed and the loading force is increased. It is preferably to have four relatively independent load means at the corners of cradle 38 as shown to provide the desired peripheral loading. These loading means generally are adjusted to apply a force sufficient not only to overcome the weight of the body 10, but in general to apply a positive lifting force, through the bearing 40, to the underside of shaft 30. This lifting effect is transmitted to the stick 34. Stationary sensing means 26, which is adjacent to stick 34 but not attached thereto sends a continuous notation of the position of stick 34 to the recording means 24.

The use of strain gauges 58, 60, 62 and 64 enables the operator of the device to determine when equal loading is achieved at all four corners of the cradle 38 if such is desired. The use of the strain gauges also enables a desired degree of unevenness in loading to be controlled at each of the four corners.

The amount of loading beyond that needed to overcome the weight of the body 10 is, in turn, overcome by the lubricant between the bearing 40 and the underside of shaft 30. The ability of the lubricant to overcome this force during rotation of the shaft is termed its "film strength" and the amount of force which the lubricant can overcome and the film thickness is a measure of its film strength.

The lubricant duct 41 may be an open tube to test the effectiveness of the lubricant under conditions of gravity feed. Also, it may be connected to a suitable source, not shown, of lubricant under pressure. The sensing means 26 and the recorder 24 may suitably be "zeroed" at the height taken by the stick 34 in the absence of lubricant. During the test a height for the top of the stick below this indicates that there is lubrication between the shaft 30 and bearing 40. The amount of vertical displacement of the stick, of course, is a measurement of the lubricant film thickness. If the lubricant film is ruptured or vaporized or in other ways nullified in its effect in overcoming the load, the stick returns towards the zero reading.

The temperature of the test is regulated by providing the body with heating or cooling coils, some of the entrance and exit ducts of which are shown at 72, 74 and 76. Also, electrical heating elements may be built into the body and be accessible to the outside, for example, by plug 78. All electrical, lubricant and thermostatic fluid leads to the body must be flexible in order to allow proper functioning of the loading means.

A commercially known sensing and recording means which can be used in this invention is the Ferranti System, which is disclosed in British Patent No. 760,321. In this system, two equally ruled gratings are superimposed with one tilted slightly with respect to the other, and light is shone through them. A Moiré Fringe pattern with an approximately sinusoidal distribution is produced as a result of the integrated interference effects caused by the angular intersection of the individual lines on each grating. This gives, in effect, a magnified pattern where the individual lines are separated. When one grating is moved with respect to the other in a direction at right angles to its line structure, the fringe pattern travels at right angles to the direction of movement, the extent of the pattern movement depending on the direction of relative travel of the two gratings.

A relative travel of one grating line width causes a complete cycle of light and dark on the interference pattern to pass a given point where it can be detected by a photosensitive element. If the number of grating lines to the inch is known precisely, the displacement of one grating with respect to the other is measured by counting the number of light and dark bands passing the photosensitive element. The waveforms from the photosensing head may be used to form a digital measuring system of four pulses per grating line.

When this system is used the sensing element 26 illustrated in the drawing is an optical unit housing a light source, lens system, index grating and phototransistor unit. Adjustments permit the fringe width, and hence the relative phases of the output signals, to be varied. The phototransistor unit uses accurately matched phototransistors and is detachable from the rest of the optical unit. The recorder 24 in this system is a counter unit which contains circuits to convert the phase and quadrature signals from the optical unit into a form suitable for operation of the reversible counter. Quadrature waveforms from the photocell amplifiers are applied to squaring, pulse forming and grating circuits which produce output pulses to operate the counter tubes. The counter is capable of following, with a margin of safety, high frequency signals which may be encountered. Positional information is displayed on five Dekatron counter tubes. When such a system is used, one of the gratings may be affixed to the upper end of the stick 34. The measurements may be calibrated as the thickness of the oil film. The loading requirements can be controlled so as to remain constant during high speed cycling or may vary during the test. If desired, the loading may be further controlled by signals from the strain gauge circuits. High-speed cycling can be provided by a number of means such as conveniently incorporating the apparatus of this invention in combination with a fatigue machine such as a Sonntag fatigue tester. The elements of this tester may be varied to meet the specific requirements of those desiring information concerning specific characteristics of oil lubricants.

In the preferred embodiment, the means of measurement will record measurements in such a way so that the scale reads on the zero position when there is a metal-to-metal contact of the shaft with the bearing such as when the shaft and bearing are at rest and there is no lubricant present. The vertical distance of the shaft to the bearing is actually the film thickness and is measured by the fringe patterns on the grating and indicated on the counter unit via the optical unit.

The lubricant tester preferably utilizes full-sized bearings in testing and also could use uniaxial loading or edge loading while employing normal, constant or cyclical conditions. The bearing is conveniently housed in the removable bearing block which fits into the testing block substantially as shown in the drawing.

The apparatus of this invention can furnish the operator with the film strength characteristics of the lubricant without the necessary cost and expense of employing actual conditions presently required to determine accurate data. The variance in the lubricating oil thickness and film strength is readily detectable, thus, lubricant deficiencies and variances can easily and inexpensively be tested.

I claim:

1. A lubricant testing device comprising a stationary base, a body mounted on resilient loading means supported by said base which means when loaded to testing position applies a vertical force to the said body, means attached to said body to substantially prevent horizontal and rotational movement of said body while allowing vertical movement, a shaft which is rotatable about an axis generally perpendicular to the movement plane of said body, means to substantially prevent vertical and horizontal movement of said shaft, a bearing in which said shaft rotates, the bearing being mounted in said body, means for supplying oil to the space between the shaft and the bearing, and means responsive to the vertical movement of said bearing to measure the oil thickness between the said shaft and said bearing.

2. The lubricant testing device of claim 1 wherein the resilient loading means is a plurality of means within the periphery of the bottom of the body.

3. The lubricant testing device of claim 2 including means to vary the upward force of the resilient loading means.

4. The device of claim 2 wherein the resilient loading means is coil springs.

5. The lubricant testing device of claim 1 wherein the means to substantially prevent horizontal movement of said body while allowing vertical movement are flex bars attached to the body and said base.

6. The device of claim 5 wherein means are attached to the said flex bars to indicate the extent of flexing of said flex bars.

7. The device of claim 6 in which the means to indicate the extent of flexing are strain gauges.

8. A lubricant testing device comprising a stationary base, a body mounted on resilient loading means within the periphery of the bottom of the body which means when loaded to testing position applies a vertical force to the body, flex bars attached to said body to substantially prevent horizontal and rotational movement of said body while allowing vertical movement, a shaft which is rotatable about an axis generally perpendicular to the movement plane of said body, means to substantially prevent horizontal and vertical movement of said shaft, a bearing in which said shaft rotates, the bearing being mounted in said body, means to vary the vertical force of said resilient loading means, strain gauges attached to said flex bars to indicate the extent of flexing of said flex bars, means for supplying oil to the space between the shaft and the bearing, and means responsive to the vertical movement of said bearing to measure the oil thickness between said shaft and said bearing.

9. The device of claim 8 wherein the resilient loading means is coil springs.

10. A lubricant testing device comprising a stationary base, a body mounted on resilient loading means supported by said base which means when loaded to testing position applies a vertical force to said body, a shaft which is rotatable about an axis generally perpendicular to the movement plane of said body, a bearing in which said shaft rotates mounted in said body, means to substantially prevent vertical and horizontal movement of said shaft, means attached to said body to substantially prevent horizontal and rotational movement of said body while allowing for vertical movement of said body, means for supplying oil to the space between the shaft and the bearing, sensing means including an optical diffraction grating attached to said body to indicate the oil thickness between said shaft and said bearing, means for recording said indication of said sensing means, said sensing means and means for recording attached to the base by means of vertical standards and fixedly attached to each other, and loading springs supporting the body on the base.

11. The lubricant testing device of claim 10 wherein the means to substantially prevent horizontal movement of said body are flex plates attached to the base.

References Cited in the file of this patent

UNITED STATES PATENTS 2,872,805    Cochran et al.    Feb. 10, 1959

FOREIGN PATENTS 1,054,743    Germany    Apr. 9, 1959